(12) United States Patent
Ludger (10) Patent No.: US 9,988,017 B2
(45) Date of Patent: Jun. 5, 2018

(54) ACCESS AND DRIVER AUTHENTICATION SYSTEM WITH INCREASED SECURITY AGAINST RELAY ATTACKS USING MOVEMENT SENSOR TECHNOLOGY INTEGRATED INTO THE AUTHENTICATION TOOL

(71) Applicant: Hella KGaA Hueck & Co., Lippstadt (DE)

(72) Inventor: Weghaus Ludger, Lippstadt (DE)

(73) Assignee: Hella KGaA Hueck & Co., Lippstadt (DE)

( * ) Notice: Subject to any disclaimer, the term of this patent is extended or adjusted under 35 U.S.C. 154(b) by 0 days. days.

(21) Appl. No.: 15/566,965

(22) PCT Filed: Apr. 25, 2016

(86) PCT No.: PCT/EP2016/059179
§ 371 (c)(1),
(2) Date: Oct. 16, 2017

(87) PCT Pub. No.: WO2016/173984
PCT Pub. Date: Nov. 3, 2016

(65) Prior Publication Data
US 2018/0099640 A1      Apr. 12, 2018

(30) Foreign Application Priority Data

Apr. 29, 2015 (DE) .......................... 10 2015 106 621

(51) Int. Cl.
*B60R 25/24* (2013.01)
*B60R 25/30* (2013.01)
(Continued)

(52) U.S. Cl.
CPC .............. *B60R 25/24* (2013.01); *B60R 25/01* (2013.01); *B60R 25/30* (2013.01);
(Continued)

(58) Field of Classification Search
CPC ......... B60R 25/24; B60R 25/01; B60R 25/30; G07C 9/00309
(Continued)

(56) References Cited

U.S. PATENT DOCUMENTS 6,146,312 A * 11/2000 Sclichter ............ A63B 23/0244
340/573.7
8,285,381 B2 * 10/2012 Fahey .................. A61H 39/002
607/115
(Continued)

FOREIGN PATENT DOCUMENTS

DE      102014001303 A1    8/2014
EP          1721793 A1    11/2006

*Primary Examiner* — Allen T Cao
(74) *Attorney, Agent, or Firm* — Husch Blackwell LLP (57) ABSTRACT

An authentication system for vehicles that has a minimum of one authentication element for detecting a movement, vibration and/or inclination. An apparatus generates a movement, vibration and/or inclination. The authentication element, in particular a key or a keyless go device for a vehicle, for example an automobile, has a wireless interface for sending and receiving an authentication signal and a sensor element for detecting a movement, vibration and/or inclination. The apparatus is positioned in/on the vehicle, and has at least one actuator for generating a movement, vibration and/or inclination, as well as a wireless device for sending and receiving an authentication signal. The at least one actuator is positioned on a transmission device, in particular on a vehicle, in order to generate an authentication signal through a movement, vibration and/or inclination. It also transmits this signal to the authentication element. A process is provided for position monitoring with an authentication system, including at least one authentication element for detecting a movement, vibration and/or inclination and an apparatus for generating a movement, vibration and/or inclination.

15 Claims, 2 Drawing Sheets

(51) Int. Cl.
*B60R 25/01* (2013.01)
*G07C 9/00* (2006.01)

(52) U.S. Cl.
CPC .... *G07C 9/00309* (2013.01); *B60R 2325/108* (2013.01); *B60R 2325/205* (2013.01); *G07C 2009/00555* (2013.01); *G07C 2209/63* (2013.01)

(58) Field of Classification Search
USPC ................................................ 340/5.6–5.65
See application file for complete search history.

(56) References Cited

U.S. PATENT DOCUMENTS

| | | | |
|---|---|---|---|
| 9,700,695 B2* | 7/2017 | Steiner, III | A61M 16/06 |
| 2002/0161372 A1* | 10/2002 | Bolger | A61B 17/1757 |
| | | | 606/80 |
| 2011/0093036 A1* | 4/2011 | Mashiach | A61N 1/05 |
| | | | 607/48 |
| 2011/0202108 A1* | 8/2011 | Gross | A61N 1/0524 |
| | | | 607/46 |
| 2015/0157817 A1* | 6/2015 | Steiner, III | A61M 16/06 |
| | | | 128/206.22 |
| 2017/0241188 A1* | 8/2017 | Kalhous | E05F 15/76 |

* cited by examiner

ACCESS AND DRIVER AUTHENTICATION SYSTEM WITH INCREASED SECURITY AGAINST RELAY ATTACKS USING MOVEMENT SENSOR TECHNOLOGY INTEGRATED INTO THE AUTHENTICATION TOOL

CROSS REFERENCE

This application claims priority to PCT Patent Application No. PCT/EP2016/059179, filed 25 Apr. 2016, which itself claims priority to German Application No. 10 2015 106621.1, filed 29 Apr. 2015, the entirety of both of which are hereby incorporated by reference.

FIELD OF THE INVENTION

This invention involves an authentication system for vehicles, which has at least one authentication element for detecting a movement, vibration and/or inclination and an apparatus for generating a movement, vibration and/or inclination. In addition, the invention involves a method for position monitoring using an authentication system and an apparatus.

BACKGROUND OF THE INVENTION

Known authentication systems for vehicles such as "passive keyless systems" or "hands-free entry/go systems" or keyless entry systems do not require an authentication tool or a key to be used to activate certain actions.

Thus, it is possible with such systems, for example, to unlock a vehicle without active use of an authentication tool or car key and to start the vehicle by merely pressing a start button. This is made possible by the authentication tool or a keyless entry key with a chip that the user keeps on hand.

When systems from the state of the art of technology are used, the vehicle sends a weak signal with a range of a few meters, which is received by the authentication tool. The authentication tool then sends a signal to the vehicle, which the vehicle uses to determine whether the authentication tool is authorized and then, based on that determination, whether access or driver authentication commands can be implemented.

Thus, such authentication systems no longer require a deliberate user interaction on the authentication tool. Instead, they merely check whether the authentication tool is in the immediate vicinity of the car (in the case of access) or inside the car (in the case of driver authentication) at the moment when an authentication check is supposed to take place.

In the context of these authentication or keyless entry systems, attack scenarios relying on special properties of the technologies associated with these systems are brought to the foreground.

Thus, attack scenarios are currently known which extend the associated transmission path of the authentication system or the transmission path between the key and vehicle. These scenarios are known as relay station attacks (RSAs).

When this type of relay station attack is carried out, the signal of the vehicle to the authentication tool is forwarded or extended via a pair of antennas. An antenna/relay station must be close to the vehicle (typically less than 2 meters away) and the other antenna/relay station must be close to the authorized authentication tool (typically less than 2 meters away). The distance between the two relay stations (wireless transmission extension stations) can be very large here and is merely dependent on the specific implementation of the relay stations, whose objective is typically criminal in nature and on which it cannot be assumed that regulatory provisions have a limiting effect.

Consequently, the vehicle can be opened or started through a relay attack, even though the associated authentication tool is located outside of the usual distance for opening the vehicle or authenticating the driver.

SUMMARY OF THE INVENTION

The task underlying the invention is thus to specify an authentication system for vehicles as well as a method for position monitoring with an authentication system in which, with minimal technical effort and in the simplest way possible, a relay attack can be prevented and the overall concept of the keyless entry systems remains unchanged for the user.

This invention solves this issue specifically through the characteristics of the independent patent claims. Additional advantageous embodiments of this invention are the object of the subclaims.

An initial aspect of the invention is to ensure that an authentication system for vehicles has at least one authentication element for detecting a movement, vibration and/or inclination and an apparatus for generating a movement, vibration and/or inclination.

Throughout the description, the term "movement" is preferably defined as linear travel along a path, despite the fact that this path may have one or more bends or curves. The term "movement" also refers to change in an observed object's location over time.

The term "vibration" is preferably defined as an oscillation generated by, for example, a motor or an actuator. "Vibration" also refers to a periodic or non-periodic oscillation.

The term "inclination" in the description refers to an angular position of an object relative to another object or to a plane, which is itself freely definable. For convenience, the surface of the earth is selected as the definable plane.

Preferably, the authentication element is a key, a keyless go device for a vehicle or a keyless entry key. However, it is also possible for the authentication element to be implemented using a mobile device such as a mobile phone, tablet, laptop and/or other mobile/portable device.

Advantageously, the authentication element has a wireless interface for sending and receiving an authentication signal and, preferably, a sensor element for detecting a movement, vibration and/or inclination. This ensures both that a wireless connection can be established over the wireless interface and that any movement, vibration or inclination of the authentication element is detected.

Preferably, the apparatus is located on the vehicle side. More specifically, it is positioned in or on a vehicle. This means that the apparatus is connected to the vehicle and can be used, for example, to open and/or to start the vehicle.

It is advantageous here if the apparatus has at least one actuator for generating a movement, vibration and/or inclination and preferably a wireless device for sending and receiving an authentication signal. This makes it possible to generate a movement, vibration and/or inclination actively, specifically as an authentication signal. Furthermore, the wireless device can be used to establish the wireless connection for communicating or exchanging data. In specific embodiments, the one or more actuator(s) may be the motor of a vehicle and/or a loudspeaker and/or an electrically controllable seat and/or an electrically controllable suspension/level regulation and/or an electrically controllable steering system and/or an electrically controllable door and/or an electrically controllable sliding roof and/or an electrically controllable window pane.

Furthermore, it is advantageous if the minimum of one actuator is positioned on a transmission device, specifically on a vehicle, in order to generate an authentication signal through movement, vibration and/or inclination and preferably transfer this signal to the authentication element. This enables generation of a unique signal, which is characteristic for the vehicle and uniquely identifies this Preferably, the sensor element of the authentication element has at least one acceleration sensor and/or one rotation rate sensor and/or at least one inclinometer for the purpose of detecting a movement, vibration and/or inclination. This enables the sensor element to detect acceleration, and therefore also forces as well as the rotation speed but also the inclination, through which the movement and position of the authentication elements or even a vehicle can be detected in space.

It is also advantageous if the apparatus has a sensor device for detecting movement, vibration and/or inclination as an alternative or supplement to the minimum of one actuator. This would enable the apparatus to detect acceleration or forces as well as the rotation speed. The movement and position of the apparatus in space also allows it to detect the inclination.

Preferably, the sensor device has at least one acceleration sensor and/or at least one rotation speed sensor and/or at least one inclinometer. This specific embodiment allows for the detection of the movement and position of the apparatus in three-dimensional space.

In addition, it is advantageous if the minimum of one acceleration sensor detects a linear acceleration in at least one direction in space. Preferably, the sensor element and/or the sensor device has three acceleration sensors, advantageously positioned orthogonally to each other. This enables acceleration in space and, as a result, the spatial movement of the acceleration sensor to be detected.

It is also advantageous if the minimum of one rotation rate sensor detects an angular velocity in at least one spatial direction. Preferably, the sensor element and/or the sensor device has three rotation rate sensors, preferably positioned orthogonally to each other. This allows the angular velocity along a rotation axis to be measured, where, for example, calculation through integration can determine at what angle a body or the apparatus or the authentication element has rotated within a specific time period. Furthermore, the minimum of one rotation rate sensor can be used to determine the yaw rate (rotation about the vertical axis), the pitch rate (rotation about the transverse axis) and the roll rate (rotation about the longitudinal axis).

It is also preferable for the minimum of one inclinometer to detect a inclination or an angle in at least one spatial direction. Preferably, the sensor element and/or the sensor device has three inclinometers, preferably positioned orthogonally to each other.

This makes it possible to detect the inclination or the slope or the pitch or a relative angle of a body in reference to a plane.

In addition, it is advantageous if the apparatus has a control device, in particular a control electronics system, which is preferably connected to the minimum of one actuator, to the sensor device and/or to the wireless device. This gives the control device the ability to control and direct the minimum of one actuator, the sensor device and the wireless device.

It also preferable for the control device to have a function logic for processing authentication signals and a signal generation and detection device for generating and detecting a movement, vibration and/or inclination. Thus, the tasks of the control device can be distributed to individual sub-elements, which are specially designed for the specific task. This makes it possible to handle the individual control tasks of the control device faster and more effectively.

Furthermore, it is preferable for the control device, in particular the signal generation and detection device, to be able to actuate the minimum of one actuator in order to generate a movement, vibration and/or inclination. Thus, the control device can direct the minimum of one actuator and generate a movement, vibration and/or inclination selectively in order to generate an authentication signal.

Preferably, the sensor device detects the generated movement, vibration and/or inclination. This creates the option to detect the generated movement, vibration and/or inclination of the apparatus that generated the movement, vibration and/or inclination, in order to, for example, make a reference value available for verification using the authentication signal of the authentication element.

In this process, it is advantageous if the function logic activates the minimum of one actuator using the signal generation and actuation device, in order to convert a predetermined and/or random authentication signal into a movement, vibration and/or inclination and to generate this action. Thus, a movement, vibration and/or inclination that serves as an authentication signal can be created selectively. Using the predetermined portion of the authentication signal, it is possible to specify a movement, vibration and/or inclination selectively, where, together with the random portion of the authentication signal, an individual and very specific authentication signal can be created. As a result, the random portion or the random authentication signal can specifically be used to generate a signal that is formed differently upon each generation. This provides effective protection from external access.

Furthermore, it is advantageous if the authentication element also has a signal processing and forwarding device, which preferably converts a movement, vibration and/or inclination detected by the sensor element into an authentication signal. This makes it possible to convert an analog signal such as a movement, vibration and/or inclination into a digital signal.

Preferably, the signal processing and forwarding device forwards the authentication signal to the wireless device of the apparatus over the wireless interface. Thus, the generated movement, vibration and/or inclination reaches the apparatus from the authentication element, preferably as a digital signal, after detection by the sensor element of the authentication element. This communication via wireless interface and wireless device is preferably carried out with encryption.

It is advantageous for the control device connected to the wireless device, in particular the function logic, to compare the authentication signal received by the wireless device in the function logic with the authentication signal detected with the sensor device and/or with the authentication signal that is generated by the function logic, predetermined and/or random. This comparison enables verification that the authentication element and the apparatus remain in an adjacent area with regard to location, i.e. that the authentication element is positioned within the vehicle on which the apparatus is preferably arranged.

A second aspect of the invention is to ensure that a method for position monitoring with an authentication system is specified, where the authentication system includes at least one authentication element for detecting a movement, vibration and/or inclination and an apparatus for generating a movement, vibration and/or inclination.

Note specifically that the characteristics of the authentication system and in particular the authentication element as well as the apparatus, as mentioned under the initial aspect of the invention, can be used individually or in combination with each other during the process for position monitoring.

In other words, the characteristics mentioned above under the first aspect of the invention concerning the authentication system with the authentication element and the apparatus can also be combined with further characteristics here under the second aspect of the invention.

The process preferably includes the following steps. A preferred step involves the generation of authentication signals in the form of a movement and/or a vibration by the apparatus. This enables an authentication element to be transported in or along a body. An additional preferred stop involves the detection of the authentication signals by the authentication element. Thus, the signals generated by the apparatus are received by the authentication element, in particular in cases when this element is located on or in a transmission element of the apparatus such that a movement and/or vibration can be received. Preferably the process includes transmission of the detected authentication signals from the authentication element to the apparatus. This transmits the signals received or detected by the authentication element back to the apparatus. Another preferred step involves a comparison of the generated authentication signals with the detected authentication signals in the apparatus. This enables verification of whether the authentication element is positioned in the immediate vicinity or in the movement area and/or vibration area of the apparatus.

Conveniently, if the comparison is positive, the position of the authentication element can be defined in the movement and/or vibration area of the apparatus. In the event of a positive comparison, it is also advantageous if, for example, a function, especially the authorization for moving a vehicle, is activated. Thus, a positive authentication or verification can have a direct effect on a vehicle.

It is also preferable if, in the event of a negative comparison, the position of the authentication element is not known. In other words, it is advantageous that, in the event of a negative comparison, a safety function is activated, in particular an audible and/or visual warning. This allows the apparatus to alert the user to any unauthorized access. In addition, in the event of a negative comparison, driver authentication can be revoked for a vehicle and suitable measures can be initiated, such as turning the engine off, limiting the driving speed to a very low speed, generating a visual or audible alert or transmitting a warning to the police or owner using existing wireless channels.

During the step involving generation of the authentication signals in the form of a movement and/or a vibration, it is advantageous if this step includes activation of the one or more actuator(s) of the apparatus in order to generate movement and/or vibration. This enables easy generation of movements and/or vibrations using an actuator.

It is also advantageous if the detection of the authentication signals involves detection using the signal processing and forwarding device of the authentication element, with the help of the sensor element. This allows individual tasks of the authentication element to be distributed to separate sub-devices, such as the signal processing and forwarding device, where the processing speed of the signals, and thus the processing speed of the entire authentication element, can be increased.

Furthermore, it is advantageous if the transmission of the detected authentication signals includes the transmission of the signal processing and forwarding device to the control device, in particular to the function logic, over a wireless connection of the wireless interface and the wireless device. After detection of the authentication signals, this enables wireless transmission of the authentication signals to the apparatus as a movement and/or vibration.

Furthermore, it is advantageous if the comparison of the generated authentication signals with the detected authentications signals includes the comparison of the signals in the control device, in particular in the function logic. This means that the signal generated by the apparatus can be compared to that detected by the authentication element.

For the following three steps (connection, synchronization and activation), it is advantageous if these steps are carried out before generation of the authentications signals.

The preferred connection step involves connecting the apparatus with the authentication element by establishing a wireless connection. Thus, a wireless connection can be established between the apparatus and the authentication element in order to, for example, send signals wirelessly from one element to another.

Preferably, the synchronization step includes a synchronization of the time between the authentication element and the apparatus over the existing wireless connection. This makes it possible to ensure that the clocks and/or the timekeeping system are running synchronously both in the authentication element and in the apparatus.

Preferably, the activation step involves activating the sensor element of the authentication element. This makes it possible to supply the sensor element with power only when the element is needed. Thus, the service life of a battery in the authentication element, for example, can be extended.

For the step of connecting the apparatus to the authentication element, it is advantageous if this step involves connecting the control device of the apparatus with the signal processing and forwarding device of the authentication element by establishing a wireless connection between the wireless interface of the authentication element and the wireless device of the apparatus. This enables the signal processing and forwarding device and the apparatus to communicate with each other wirelessly and, for example, through exchange of data and/or signals.

Furthermore, it is advantageous if connection of the control device with the wireless interface is initiated through activation of a trigger element of the apparatus. For this purpose, the apparatus is also preferably equipped with a trigger element. This enables the trigger element to be used to initiate the establishment of a wireless connection. Continuous attempts to establish the connection are not necessary.

It is also advantageous if the synchronization of time between the authentication element and the apparatus involves synchronization of the time between the function logic of the apparatus and the signal processing and forwarding device of the authentication element over the existing wireless connection. Thus, the function logic and the signal processing and forwarding device act as elements specially suited for handling time synchronization, preferably resulting in time elapsing at the same time in both of them. In simple terms, this means that the time synchronization step involves comparing the clocks and ensuring that they match.

It is also advantageous if the activation of the sensor element of the authentication element involves activation of the sensor element by the signal processing and forwarding device. This enables use of the signal processing and forwarding device to selectively actuate the sensor element in order to save energy in the authentication element, for instance, in case of lack of a wireless connection.

Furthermore, it is preferable if, when generating authentication signals, the minimum of one actuator is controlled by the control device. Thus, the control device can direct the minimum of one actuator with precision to generate a movement and/or vibration.

Preferably, the signal generation and detection device of the apparatus controls the one or more actuator(s) in accordance with instructions from the function logic in order to convert an authentication signal into a movement and/or vibration. This allows the generation of movement and/or vibration in the apparatus by the function logic to be predetermined/configured.

It is also preferable if, upon generation of authentication signals, the minimum of one actuator is started at a defined point in time. That allows the start time for the generation process, for example, to be defined precisely, enabling the movement and/or vibration with reference to this defined point in time or definable start time to be detected.

Furthermore, it is advantageous if, upon detecting the authentication signals, the signal processing and forwarding device detects the authentication signals detected by the sensor element as a function of the synchronized time. Preferably, this can work in combination with the time synchronization to ensure exact detection of the movement and/or vibration as a function of time.

It is also advantageous if the detection of authentication signals takes place within a specified time window. In this case, it can be predetermined in what time span a movement and/or vibration is to be detected.

Furthermore, it is preferable if the comparison step also includes a comparison of the authentication signals as a function of time. As a result, an additional parameter can, with the aid of time, be used for the comparison in order to ensure effective position monitoring. This is because, if the detected movement and/or vibration indeed matches the generated movement and/or vibration yet the time offset of the movement and/or vibration between the detected and generated authentication signals exceeds a definable value, then a relay attack, for example, can be detected.

It is also preferable for the subsequent generation and detection steps to be carried out as an alternative to or in addition to the abovementioned generation and detection steps for the authentication signal.

As such, it is advantageous if an additional preferred step includes the generation of authentication signals through reading out the gradient or the angle from the sensor device of the apparatus. This can establish an additional or alternative parameter for authentication, which makes the process for position monitoring more secure and more effective.

It is preferable if one step involves detection of authentication signals through reading the gradient or the angle from the sensor element of the authentication element. This also allows for the detection of the gradient or the angle and the inclination by the sensor element of the apparatus in addition to the detection of the gradient or the angle and the inclination by the sensor device. This means that an additional parameter can be created, which can be used for position monitoring of the authentication element and the apparatus.

Furthermore, it is advantageous if the subsequent steps of the comparison are carried out as an alternative to or in addition to the step of comparing the authentication signals.

As such, it is advantageous if an additional preferred step includes a comparison of the authentication signals generated by the sensor device of the apparatus with the authentication signals of the authentication element detected by the sensor element. The authentication signals are preferably those for an inclination. However, it is also conceivable that the authentication signals include a movement and/or vibration as well. This means that it is easy to draw a comparison of whether the authentication element is located within the effective range of the authentication signals generated by the device, in particular in the area with a similar inclination.

Preferably, the comparison or the comparison step is carried out in the control device, in particular in the function logic. As a result, individual tasks are assigned to individual elements or apparatuses, which may be result in a change such as a speed increase.

Advantageously, a positive comparison means that the position of the authentication element can be determined on an area with essentially the same inclination, especially in relation to the apparatus.

The phrase "essentially" indicates a deviation by an identical angle. This deviation includes, as the word "essentially" is defined here, +/−8 percent, in particular +/−3 percent. A value even less than +/−3 percent is advantageous In the event of a positive comparison, it is also advantageous if, for example, a function, especially the authorization for moving a vehicle, is activated. Thus, a positive authentication or verification can have a direct effect on a vehicle.

It is also preferable if, in the event of a negative comparison, the position of the authentication element is not known or is classified as "unknown." In other words, it is advantageous, in the event of a negative comparison, for a safety function to be activated, in particular an audible and/or visual warning.

This allows the apparatus to alert the user to any unauthorized access.

Furthermore, it is advantageous if the step of generating authentication signals through activation of the minimum of one actuator includes a definable variation of the movement over time, amplitude and/or frequency generated by the minimum of one actuator. As a result, a movement and/or vibration in the form of an authentication signal can have a modulation with respect to time, amplitude and frequency, enabling a variety of different authentication signals for generation.

Advantageously, the step for transmitting the authentication signals includes encryption and/or compression of the authentication signals. An additional protection mechanism can be implemented in the inventive procedure to prevent manipulation.

It is also advantageous if, upon comparison of the authentication signals of the authentication elements with the authentication signals of the apparatus, both signals match and if the authentication signals of the authentication element lie within a definable tolerance range that is approximately equal to the values of the authentication signals of the apparatus. As such, it is possible that a positive authentication is present if the detected and generated authentication signals lie within a definable tolerance range of each other. Ideally, this tolerance range should be kept small in order to increase security against attacks.

It is also advantageous if, after comparison of the authentication signals, the wireless connection between the wireless interface and the wireless device is disconnected. This makes it possible to save energy, especially in the authentication element.

It is also advantageous if the sensor element of the authentication element is deactivated by the signal processing and forwarding device. This saves energy as well, particularly in the authentication element, thereby increasing the service life of the power supply system, especially for a battery, in the authentication element.

It is also advantageous if the wireless interface and/or the wireless device operate(s) in the 434/315 MHz or 2.4 GHz ISM range, where, upon implementation of the authentication element as a mobile telephone, the Bluetooth Low Energy interface is preferably used.

To ensure that the transfer of movement and/or vibration from the apparatus to the authentication functions properly, it is preferable for the authentication element to be located inside a vehicle on which the apparatus is positioned.

There are a wide variety of points in time at which this process can be carried out. This makes it possible, for example, to carry out the process either before or during a trip with a vehicle. Thus, the process for position monitoring can be carried out at any desired point in time using an authentication system.

Furthermore, it is advantageous for the process if the authentication element is positioned in a vehicle on which the apparatus is also positioned. In other words, it is advantageous if the authentication element is located inside a vehicle in order to detect a movement, vibration and/or inclination from the one or more actuator(s) of the apparatus, where preferably the apparatus is also positioned on the vehicle or inside the vehicle.

In addition, it is advantageous if the process described here is used as an addition/supplement to other processes for position monitoring, in particular for the type of processes already known from the state of the art of technology. As such, an existing keyless entry system or an existing keyless entry can be improved using this invention with little effort.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

In the following description, identical reference signs are used for identical objects.

Figure 1:
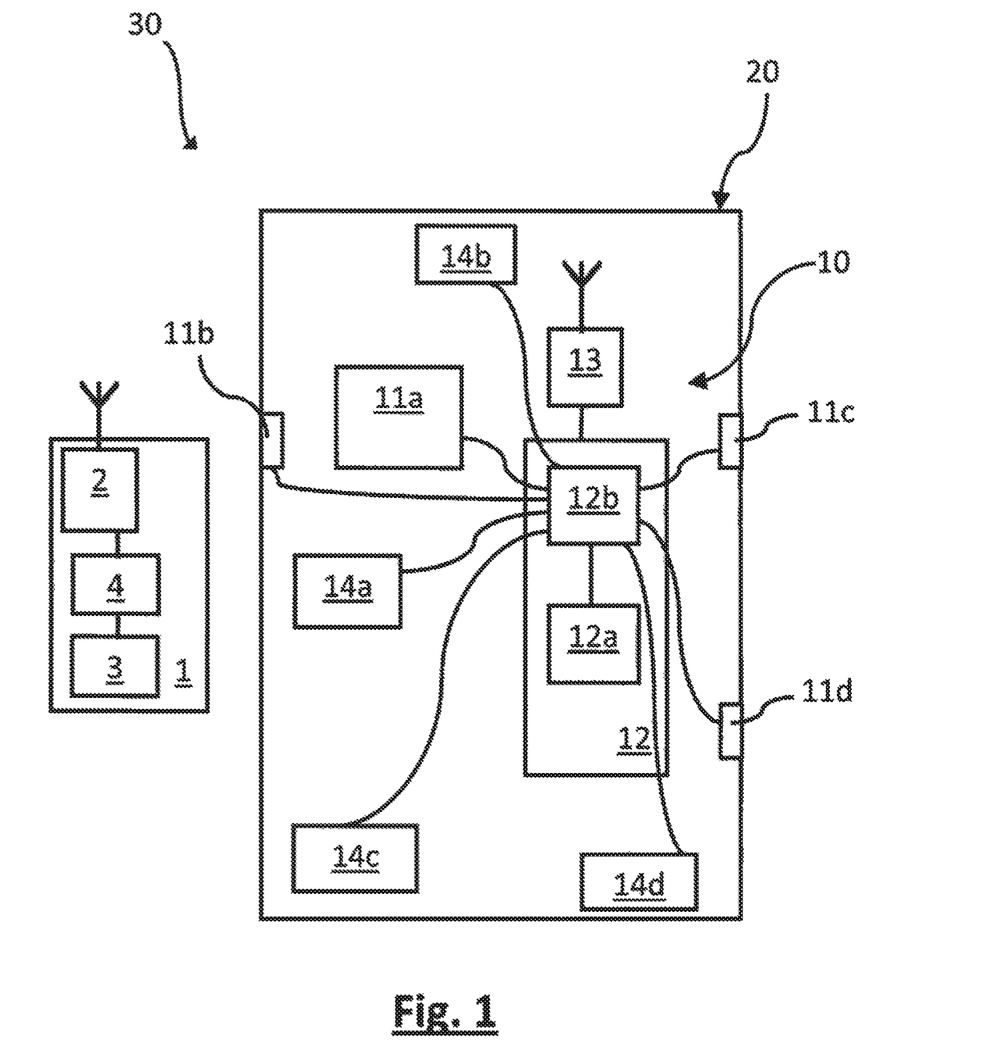
FIG. 1 is an authentication system with an authentication element and an apparatus.

FIG. 1 shows an authentication system (30) for vehicles, which has an authentication element (1) and an apparatus (10). While the authentication element is used for detecting a movement, vibration and/or inclination, the apparatus is used to generate a movement, vibration and/or inclination.

The authentication element (1) is designed in this example as a key or keyless go device for a vehicle (20) and has a wireless interface (2) for sending and receiving an authentication signal and a sensor element (3) for detecting a movement, vibration and/or inclination.

The sensor element (3) of the authentication element (1) has an acceleration or rotation rate sensor and/or an inclinometer. This enables the sensor element to detect forces, rotation rates (yaw rate, pitch rate, roll rate) and a gradient which affect the authentication element or to which the authentication element is subjected.

Furthermore, the authentication element (1) has a signal processing and forwarding device (4). This device is connected to both the sensor element (3) and the wireless interface (2). In addition, the signal processing and forwarding device (4) can be used to convert a movement, vibration and/or inclination detected by the sensor element (3) into an authentication signal.

In addition, the signal processing and forwarding device (4) can be used to forward the authentication signal(s) over the wireless interface (2) to the wireless device (13) of the apparatus (10).

The apparatus (10) is positioned on board the vehicle. In this embodiment, it is inside the vehicle (20) and has the actuators (11a, 11b, 11c, 11d), through which a movement, vibration and/or inclination can be generated.

The apparatus (10) also has four sensor devices (14a, 14b, 14c, 14d) for detecting a movement, vibration and/or inclination. Each of the sensor devices (14a, 14b, 14c, 14d) has an acceleration sensor, rotation rate sensor and an inclinometer. Thus, it is also possible to use the sensor devices (14a, 14b, 14c, 14d) to detect forces, rotation rates (yaw rate, pitch rate, roll rate) as well as the gradient or the angle measurement, where these factors affect the apparatus or where the apparatus is subject to these factors.

Of course, it is also conceivable that, for example, the sensor device 14a is designed as an acceleration sensor, while sensor devices 14b and 14c are each designed as a rotation rate sensor and sensor device 14d is designed as an inclinometer.

With respect to the authentication element (1) and the apparatus (10), the listed acceleration sensors detect a linear acceleration in at least one spatial direction, where the sensor element (3) and the sensor device (14a) each have three acceleration sensors positioned orthogonally to each other.

In addition, the sensor element (3) and the sensor devices (14b, 14c, 14d) have rotation rate sensors and inclinometers. Here, both the sensor element (3) and all sensor devices (14a, 14b, 14c, 14d) have three sensors or inclinometers positioned orthogonally to each other. The use of three acceleration sensors, rotation rate sensors or inclinometers in each case, for example, makes it possible to detect the acceleration, the rotation rate and the inclination in three-dimensional space.

When combined, this allows the apparatus (10) and the authentication element (1) to detect their position and movement in three-dimensional space.

Furthermore, FIG. 1 shows that the apparatus (10) includes a wireless device (13) for sending and receiving an authentication signal as well as a control device (12), in particular a control electronics system.

The control device (12) has, in turn, a function logic (12a) for processing authentication signals and a signal generation and detection device (12b) for generating and detecting a movement, vibration and/or inclination.

In addition, the control device (12) is connected to the actuators (11a, 11b, 11c, 11d), the sensor devices (14a, 14b, 14c, 14d) or to the individual sensors and measuring devices and to the wireless device (13).

The actuators (11a, 11b, 11c, 11d) are positioned on a transmission device (20) on a vehicle in order to generate an authentication signal through a movement, vibration and/or inclination and to transmit this signal to the vehicle, thereby enabling the generated authentication signal to be transmitted to the authentication element (1).

In order to generate a movement, vibration and/or inclination, the function logic (12a) uses the signal generation and detection device (12b) to control one or more actuators (11a, 11b, 11c, 11d) in succession or simultaneously. As a result, a predetermined and/or random authentication signal can be generated and converted (12a) into movement, vibration and/or inclination by the function logic.

The sensor devices (14a, 14b, 14c, 14d) detect the generated movement, vibration and/or inclination on the vehicle side. This makes it possible for the function logic (12a) connected to the wireless device (13) to compare the authentication signals received by the wireless device (13) to the authentication signals detected by the sensor devices (14a, 14b, 14c, 14d).

It is also conceivable that the authentication signals are additionally compared to the authentication signals that are generated by the function logic (12a), which are predetermined and/or random.

Figure 2:
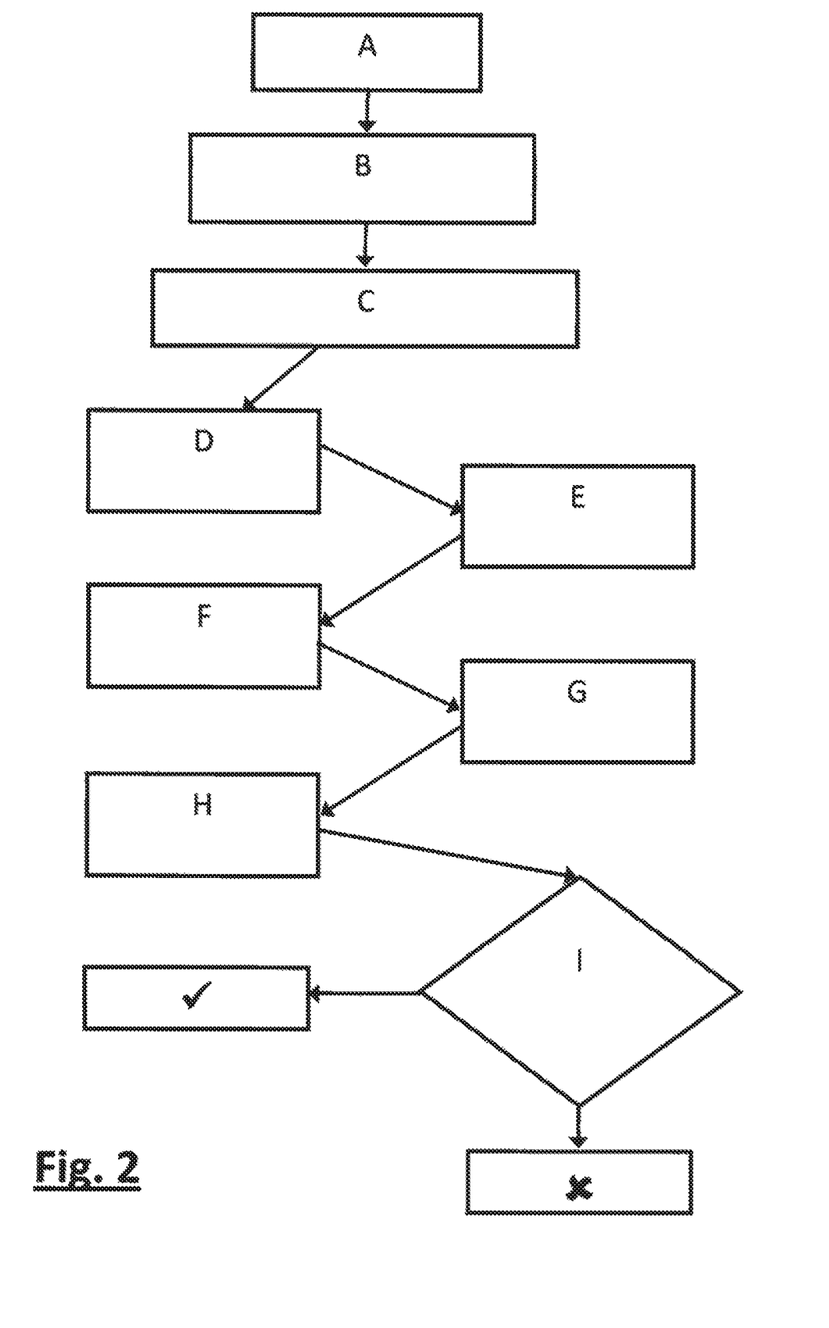
FIG. 2 is a process for position monitoring.

FIG. 2 depicts a process for position monitoring or a possible process sequence. This process is based on the description for FIG. 1.

The process for position monitoring with an authentication system (30) includes the authentication element (1) for detecting a movement, vibration and/or inclination and the apparatus (10) for generating a movement, vibration and/or inclination.

In step A, the activation of a trigger element of the apparatus (10) initiates connection of the control device (12) with the wireless interface (2).

Then in step B, a wireless connection is established between the control device (12) of the apparatus (10) and the signal processing and forwarding device (4) of the authentication element (1). In particular, the wireless connection is established between the wireless interface (2) of the authentication element (1) and the wireless device (13) of the apparatus (10).

In the following step (C), the time is synchronized between the function logic (12a) of the apparatus (10) and the signal processing and forwarding device (4) of the authentication element (1) using the established wireless connection.

Then, in step D, the sensor element (3) is activated using the signal processing and forwarding device (4) of the authentication element (1).

In step E, authentication signals are generated by the apparatus (10) in the form of a movement and/or a vibration. This is carried out through activation of one or more actuators (11a, 11b, 11c, 11d) of the apparatus (10).

In the process, the actuators (11a, 11b, 11c, 11d) are controlled by the signal generation and detection device (12b) of the control device (12). This is carried out in accordance with instructions from the function logic (12a) in order to convert an authentication signal into a movement and/or vibration or to forward an authentication signal as a movement and/or vibration.

In addition, the generation of authentication signals is started at a defined point in time in order to enable a time-based assignment of the movement and/or vibration. In addition, the authentication signals can be modulated or varied over time, amplitude and frequency in order to generate individual signals.

Furthermore, step E, i.e. authentication signal generation, includes a read-out of the inclination of the sensor device (14d) of the apparatus (10).

In step F, the generated authentication signals are detected by the signal processing and forwarding device (4) of the authentication element (1) using the sensor element (3). The detection is also carried out as a function of the synchronized time and within a specified time window.

Furthermore, authentication signals are detected by the sensor element (3) through reading the gradient or inclination of the authentication element (1).

Step G represents the transmission of the detected authentication signals from the signal processing and forwarding device (4) of the authentication element (1) to the function logic (12a) of the apparatus (10) using a wireless connection consisting of a wireless interface (2) and wireless device (13). In the process, the authentication signals are transmitted in an encrypted and compressed state in order to make them more difficult to manipulate.

In step H, the generated authentication signals are compared to the detected authentication signals in the control device (12), in particular in the function logic (12a) of the apparatus (10). This step also includes a comparison of the authentication signals as a function of time in order to make manipulation more difficult.

In addition, the authentication signals of the apparatus (10) generated by the sensor devices (14a, 14b, 14c, 14d) are compared to the authentication signals of the authentication element (1) detected by the sensor element (3) in and/or by the function logic (12a). Here, the two signals match if the authentication signals of the authentication element (1) lie within a defined tolerance range of the authentication signals of the apparatus (10).

In step 1 of the process, a query is made regarding whether the comparison is positive (successful) or negative (failed). A positive comparison is considered successful because, in that case, the position of the authentication element (1) on the movement and/or vibration area of the apparatus (10) is definable with essentially the same inclination, This in turn releases the enable signal for moving a vehicle, and the known and purely electronic challenge/response communication for checking the authentication is treated as an authentication condition.

In the event of a negative comparison, on the other hand, an audible or visual warning is activated or output in order to attract attention.

In a final and non-pictured step, the wireless connection between the wireless interface (2) and the wireless device (13) is disconnected after comparison of the authentication signals. In addition, the sensor element (3) of the authentication element (1) is deactivated by the signal processing and forwarding device (4) in order to save energy.

In other words, the inventive process can also be reproduced or briefly summarized in the manner described as follows.

Preferably, it should be ensured that a portable electronic authentication element (1) such as a mobile telephone or a keyless entry key is located inside a vehicle.

This may be necessary to start an engine, for example.

It is most effective if the authentication element (1) is a keyless entry key of the vehicle (20) or a user's mobile telephone in which specific functions of a keyless entry key are integrated.

The user wants to start their vehicle (20). To do so, they press the start/stop button in the vehicle, for example. Initiated by this trigger, a function logic (12a) of an apparatus (10) positioned on the vehicle (20) preferably ensures that a wireless connection or communication is established between the keyless entry key or authentication element (1) that the user keeps on their person for authentication purposes and a wireless device (13) in the vehicle or that this wireless connection/communication is maintained in case it has already been established at this point.

Preferably, a challenge/response communication exchange takes place between the authentication element (1) and the vehicle (20) or the function logic (12a) of the apparatus (10) as the initial stage of an authentication process.

In addition, a time synchronization preferably takes place over the wireless connection between the vehicle (20) or the function logic (12a) and the authentication element (1). This is important due to the correlation of the vehicle movements and the movements measured by the authentication element (1).

In the course of this, the use or activation of a sensor element (3) is also activated for the authentication element (1). The sensor element (3) preferably shall not be activated continuously due to the standby current.

Once both sides have been synchronized, the function logic (12a) in the vehicle (20) ensures that a signal generation and detection device (12b) activates one or more movement-generating actuators (11a, 11b, 11c, 11d).

This can, for example, be the engine start or, where applicable, at least if the conventional authentication process was completed successfully, a driving movement of the vehicle in accordance with user requests.

The point in time when authentication signals are generated is preferably controlled by the function logic (12a) with precision. This can ensure that there are defined and known time offsets for the authentication signals, where it is a matter of a time-based assignment of the generated and detected movement and/or vibration.

Then, the authentication element (1) or its sensor element (3) preferably measures the incoming authentication signals during this expanded authentication phase and preferably transmits them in digitized and encrypted form over the wireless interface (2) to the function logic (12a) in combination with information regarding the time that they are received.

As an addition, a sensor device (14a, 14b, 14c, 14d) can also receive the authentication signals in the vehicle (20) during this time and forward them over conventional vehicle-internal interfaces to the function logic (12a).

In the function logic (12a), the authentication signals are then preferably checked against each other for plausibility (during or after the measurement process). Here, there must exist a lower limit for correlation.

The authentication signal generated in the movement-generating actuators (11a, 11b, 11c, 11d) has preferably been generated by the vehicle-side apparatus (10) itself and is thus, conveniently, fully known and the authentication signal detected at the authentication element (1) has ideally been transmitted over a safe (encrypted) channel to the vehicle-side apparatus (10).

The information of the sensor device (14a, 14b, 14c, 14d) installed in the vehicle (20) can preferably be used as a supplementary reference, making the signal evaluation more durable overall.

If the movement of a vehicle (20) and the movement detected in the authentication element (1) correlate, then the authentication process is preferably completed successfully in the second instance and driver authentication is granted.

If necessary the authentication process can be set up to take place recurrently, which makes the authentication system even more secure.

REFERENCE NUMERAL LIST

1 Authentication element
2 Wireless interface
3 Sensor element
4 Signal processing and forwarding device
10 Apparatus
11a-d Actuator
12 Control device
12a Function logic
12b Signal generation and detection device
13 Wireless device
14a-d Sensor device
20 Transmission device

The invention claimed is:

1. An authentication system for vehicles, said authentication system comprising:
   at least one authentication element for detecting at least one of a movement, vibration, and inclination, said authentication element including:
      a wireless interface for sending and receiving an authentication signal;
      a sensor element for detecting at least one of a movement, vibration, and inclination; and
   an apparatus for generating at least one of a movement, vibration, and inclination, said apparatus including:
      at least one actuator for generating the at least one of movement, vibration, and inclination; and
      a wireless device for sending and receiving an authentication signal;
      wherein the apparatus is positioned in or on the vehicle; and
      wherein the at least one actuator is positioned on a transmission device on a vehicle in order to generate an authentication signal caused by the at least one of movement, vibration, and inclination and transfer this signal to the authentication element.

2. The authentication system in accordance with claim 1, where the sensor element of the authentication element has at least one of an acceleration sensor, one rotation rate sensor, and inclinometer for the purpose of detecting a at least one of movement, vibration, and inclination.

3. The authentication system in accordance with claim 2, where a said one acceleration sensor detects a linear acceleration in at least one spatial direction, and the sensor element has three acceleration sensors positioned orthogonally to each other,
   where a said rotation rate sensor detects an angular velocity about a at least one spatial direction, and the sensor element has three rotation rate sensors positioned orthogonally to each other,
   where a said inclinometer detects a gradient or an angle in at least one spatial direction, and the sensor element has three inclinometers positioned orthogonally to each other.

4. The authentication system in accordance with claim 1, where the apparatus has a sensor device for detecting at least one of a movement, vibration, and inclination, and where the sensor device has at least of a acceleration sensor, a rotation rate sensor, and a minimum of one inclinometer.

5. The authentication system in accordance with claim 4, where the at least one acceleration sensor detects a linear acceleration in at least one spatial direction, and the sensor device has three acceleration sensors positioned orthogonally to each other,
   where the at least one rotation rate sensor detects an angular velocity in at least one spatial direction, and the sensor device has three rotation rate sensors positioned orthogonally to each other, where the at least one inclinometer detects a gradient or an angle in at least of one spatial direction and the sensor device has three inclinometers positioned orthogonally to each other.

6. The authentication system in accordance with claim 4, where the apparatus also has a control device which is connected with the at least one of actuator the sensor device, and the wireless device, where the control device preferably has a function logic for processing authentication signals and a signal generation and detection device for generating and detecting at least one of a movement, vibration, and inclination, where the control device actuate the at least one actuator to generate at least one of a movement, vibration, and inclination, where the sensor device detects the at least one generated movement, vibration, or inclination, where the function logic actuate the at least one actuator in order to convert a predefined and/or random authentication signal into at least one of movement, vibration, and inclination and to generate same.

7. The authentication system in accordance with claim 6, where the authentication element also has a signal processing and forwarding device which converts at least one of a movement, vibration, and inclination detected by the sensor element into an authentication signal and forwards the authentication signal over the wireless interface to the wireless device of the apparatus, where the control device connected to the wireless device compares the authentication signal received by the wireless device in the function logic to the authentication signal detected by the sensor device or to the authentication signal generated by the function logic, which is predefined or random.

8. A process for position monitoring with an authentication system in accordance with claim 1, where the authentication system includes at least one authentication element for detecting at least one of a movement, vibration, and inclination and an apparatus for generating at least one of a movement, vibration, and inclination, the process comprising the steps of:

generating an authentication signal by the apparatus in the form of at least one of a movement and a vibration, detecting the authentication signals by the authentication element, transmitting the detected authentication signals from the authentication element to the apparatus, comparing the generated authentication signals with the detected authentication signals in the apparatus, wherein when the comparison is positive, the position of the authentication element is defined on the movement and/or vibration area of the apparatus, wherein in the event of a positive comparison, a function is activated, wherein in the event of a negative comparison, the position of the authentication element is not known and wherein in the event of a negative comparison, a safety function is activated.

9. The process in accordance with claim 8, wherein the generation of authentication signals includes, in the form of a movement and/or vibration, the activation of at least one actuator of the apparatus for generating movements and/or vibration, wherein the detection of the authentication signals includes detection using the signal processing and forwarding device of the authentication element using the sensor element, wherein the transmission of the detected authentication signals includes transmission from the signal processing and forwarding device to the control device over a wireless connection of the wireless interface and wireless device, wherein the comparison of the generated authentication signals with the detected authentications signals includes the comparison of the signals in the control device, in particular in the function logic.

10. The process in accordance with claim 8, where the process includes the following additional steps, which are preferably carried out before the generation of authentication signals:

connecting the apparatus to the authentication element through establishing a wireless connection, synchronizing the time between the authentication element and apparatus over the established wireless connection and activating the sensor element of the authentication element.

11. The process in accordance with claim 10, where the connection of the apparatus to the authentication element includes connecting the control device of the apparatus to the signal processing and forwarding device of the authentication element by establishing a wireless connection between the wireless interface of the authentication element and the wireless device of the apparatus, where the connection of the control device to the wireless interface is initiated through activation of a trigger element of the apparatus, where the synchronization of the time between the authentication element and the apparatus includes synchronization of the time between the function logic of the apparatus and the signal processing and forwarding device of the authentication element over the established wireless connection, where the activation of the sensor element of the authentication element includes activation of the sensor element by the signal processing and forwarding device.

12. The process in accordance with claim 8, where, upon generation of authentication signals, the at least one actuator is controlled by the control device, where the signal generation and detection device actuates the at least one actuator in accordance with the function logic in order to convert an authentication signal into a movement and/or vibration, where upon generation of the authentication signals, the at least one actuator is started at a defined point in time, where upon detection of the authentication signals, the signal processing and forwarding device detects the authentication signals detected by the sensor element as a function of the synchronized time, where the detection of authentication signals takes place within a specified time and where the comparison step also includes a comparison of the authentication signals as a function of time.

13. The process in accordance with one of the claims 8 to 12, where the subsequent steps are carried out as supplement to the steps of generating and detecting authentication signals:

generating authentication signals through reading the gradient or the angle from the sensor device of the apparatus, detecting authentication signals through reading the gradient or the angle from the sensor element of the authentication element.

14. The process in accordance with claim 8, where the subsequent steps are carried out as supplement to the step of comparing the authentication signals:
- comparing the authentication signals generated by the sensor device of the apparatus with the authentication signals of the authentication element detected by the sensor element, where, in the event that the comparison is positive, the position of the authentication element is defined down to a range with largely the same inclination,
- where in the event of a positive comparison, a function is activated,
- where, in the event of a negative comparison, the position of the authentication element is not known and
- where in the event of a negative comparison, a safety function is activated.

15. The process in accordance with claim 8, wherein,
- the step of generating authentication signals through activation of the at least one actuator includes a definable variation of the movement generated by the at least one actuator over time, amplitude and/or frequency,
- the step of transmitting the authentication signals includes encryption and/or compression of the authentication signals,
- upon comparison of the authentication signals of the authentication element with the authentication signals of the apparatus, the two sets of signal data match if the authentication signals of the authentication element lie within a definable tolerance range that is approximately equal to the values for the authentication signals of the apparatus,
- after comparison of the authentication signals, the wireless connection between the wireless interface and the wireless device is disconnected, where the sensor element of the authentication element is also deactivated by the signal processing and forwarding device.

* * * * *